United States Patent [19]

Takami et al.

[11] Patent Number: 5,244,757
[45] Date of Patent: Sep. 14, 1993

[54] LITHIUM SECONDARY BATTERY

[75] Inventors: Norio Takami; Takahisa Ohasaki, both of Kanagawa, Japan

[73] Assignee: Kabushiki Kaisha Toshiba, Kanagawa, Japan

[21] Appl. No.: 819,224

[22] Filed: Jan. 13, 1992

[30] Foreign Application Priority Data

Jan. 14, 1991 [JP] Japan .................... 3-002859
May 15, 1991 [JP] Japan .................... 3-110607
Jul. 29, 1991 [JP] Japan .................... 3-187999
Jul. 31, 1991 [JP] Japan .................... 3-213194

[51] Int. Cl.$^5$ .......................................... H01M 10/40
[52] U.S. Cl. .................................... 429/194; 429/218
[58] Field of Search ............. 429/194, 218, 196, 197; 423/435

[56] References Cited

U.S. PATENT DOCUMENTS

| | | |
|---|---|---|
| 4,668,595 | 5/1987 | Yoshino et al. |
| 4,702,977 | 10/1987 | Hiratsuka et al. |
| 4,752,422 | 2/1988 | Miyabayashi et al. ......... 423/445 X |
| 4,835,075 | 5/1989 | Tajima et al. ................. 429/194 |
| 4,863,814 | 9/1989 | Mohri et al. |
| 5,028,500 | 7/1991 | Fong et al. ................... 429/194 |
| 5,187,035 | 2/1993 | Miyabayashi et al. ......... 429/218 |

FOREIGN PATENT DOCUMENTS 0201038 11/1986 European Pat. Off.
0409192 1/1991 European Pat. Off.
WO90/13924 5/1989 World Int. Prop. O.

OTHER PUBLICATIONS

Kuniaki Inada, et al., "Development of Li-Linear-- Graphite Hybrid/amorphous V$_2$O$_5$ coin-type secondary battery", 1987, pp. 530-539, Primary and Secondary Ambient Temperature Lithium Batteries, The Electrochemical Society, Inc., Pennington, N.J.

Primary Examiner—Anthony Skapars
Attorney, Agent, or Firm—Finnegan, Henderson, Farabow, Garrett & Dunner

[57] ABSTRACT

A lithium secondary battery which comprises a vessel, a positive electrode, a negative electrode and an electrolyte. Both of the electrodes are placed in the vessel and the vessel is filled with the electrolyte. The negative electrode includes carbonaceous material spherical particles or carbonaceous fibers which absorb and discharge lithium ions. The carbonaceous material has a graphite-like layered structure part and a turbulence-layered structure part. Fine structures of the carbonaceous material spherical particles are arranged in point-orientation.

18 Claims, 5 Drawing Sheets

LITHIUM SECONDARY BATTERY

BACKGROUND OF THE INVENTION

1. Field of the Invention

This invention relates to a lithium secondary battery and, more particularly, to a lithium secondary battery having an improved negative electrode.

2. Discussion of the Related Art

In recent years, a nonaqueous electrolyte battery using lithium as a negative electrode active material has attracted attention as a high energy density battery. Of such nonaqueous electrolyte batteries, a primary battery using a light metal such as lithium, sodium, or aluminum as a negative electrode active material and manganese dioxide ($MnO_2$), carbon fluoride [$(CF)_n$], thionyl chloride ($SOCl_2$), or the like as a positive electrode active material is already widely used as a power source of a timepiece or an electric calculator, or as a backup battery of a memory.

In addition, as the sizes and weights of various types of electronic equipment, such as communication equipment or VTR devices and so on, have been decreased, a demand for a secondary battery having a high energy density which can be suitably used as a power source of such equipment has been increased, and the nonaqueous electrolyte secondary battery has been actively studied. For example, a nonaqueous electrolyte secondary battery using lithium as a negative electrode and an electrolyte prepared by dissolving an electrolytic salt such as $LiClO_4$, $LiBF_4$, $LiAsF_6$, or $LiPF_6$ in a nonaqueous solvent such as propylene carbonate (PC), 1,2-dimethoxyethane (DME), $\gamma$-butyrolactone ($\gamma$-BL), or tetrahydrofuran (THF) has been studied. In addition, a compound which topochemically reacts with lithium such as $TiS_2$, $MoS_2$, $V_2O_5$, or $V_6O_{13}$ has been studied as a positive electrode active material.

The above secondary battery, however, has not been put into practical use yet. This is mainly because the charge/discharge efficiency of the battery is low and the number of charge/discharge times or cycle life is short. It is assumed that this is because the lithium negative electrode becomes degraded due to a reaction with the electrolyte. That is, lithium dissolved in an electrolyte as lithium ions upon discharge reacts with a solvent and the surface of the lithium is partially deactivated when it precipitates upon charging. Therefore, when charge/discharge is repeated, lithium is precipitated in the form of dendrites or small spheres, or is separated from the collector.

For these reasons, carbonaceous materials which are able to absorb or release lithium such as coke, sintered resin, carbon fiber or thermally decomposed epitaxial carbon, have been used to prevent the degradation of a negative electrode caused by reaction between lithium and nonaqueous electrolyte solution or by dendrite precipitation. However, because of the small absorbing-releasing capacity of lithium ion, the specific capacity of such a negative electrode is relatively small. Theoretically, increasing the absorbability of lithium ion should enlarge the charging capacity. However, such an increase has been difficult to achieve because the structure of the carbonaceous material deteriorates or the solvent in the electrolyte decomposes. Furthermore, there is a problem that when charging current density is elevated, the absorbed lithium quantity releases less metallic lithium As a result, it is difficult to improve the cycle life of a lithium secondary battery including such a negative electrode.

SUMMARY OF THE INVENTION

Accordingly, it is an object of the present invention to provide an improved lithium secondary battery with high capacity and superior cycle life.

It is a further object of the invention to provide an improved method for producing a negative electrode for a lithium secondary battery.

To accomplish the above described objects, a lithium secondary battery is provided which comprises a vessel; a positive electrode containing an active material housed in the vessel; a lithium ion conductive electrolyte in the vessel; and a negative electrode arranged in the vessel, containing carbonaceous material spherical particles or carbonaceous fibers as active materials that absorb and discharge lithium ions. The carbonaceous materials contain a graphite structure part and a turbulence-layered structure part, and fine structures of the carbonaceous material spherical particles are arranged in point-orientation.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings Of the Drawings.

DESCRIPTION OF THE PREFERRED EMBODIMENTS

A lithium secondary battery according to the present invention will be described below with reference to FIG. 1.

Figure 1:
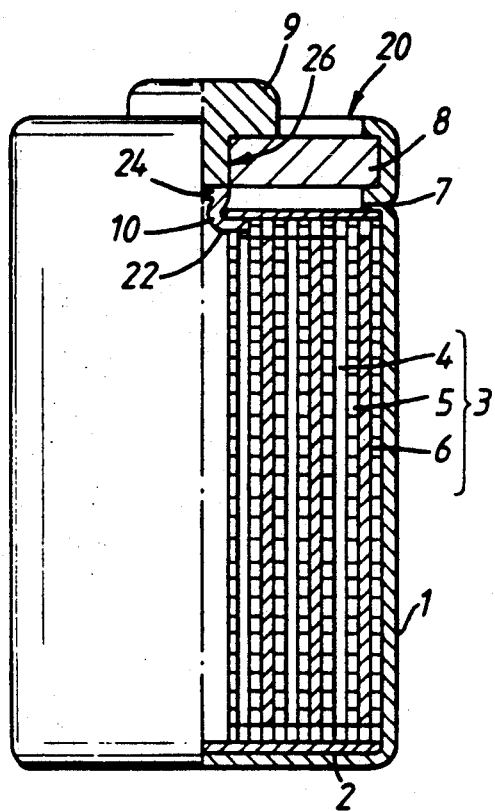
FIG. 1 is a partial vertical sectional view showing a structure of an embodiment according to the present invention.

Referring to FIG. 1, a cylindrical case 1 having a bottom houses an insulator 2 arranged on its bottom and electrodes 3. The case 1 is typically made of stainless steel. The electrodes 3 have a structure in which a band-like member obtained by stacking a positive electrode 4, a separator 5, and a negative electrode 6 in the order named in a spirally wound configuration with the negative electrode 6 located outside. The case 1 contains a nonaqueous electrolyte. Insulating paper 7 having an opening formed in its central portion is placed above the electrodes 3 housed in the case 1. An insulting opening sealing plate 8 is arranged at an upper opening portion 20 of the case 1 and liquid-tightly fixed to the case 1 by calking the upper opening portion 20 inwardly. A positive terminal 9 is fit in the center of the plate 8. One end 22 of a positive lead 10 is connected to the positive electrode 4 and the other end 24 is connected to the positive terminal 9. The negative electrode 6 is connected to the case 1 as a negative terminal via a negative lead (not shown).

The positive electrode 4 contains an oxide compound or a chalcogen compound as an active material Examples of such compounds are manganese dioxide, a lithium-manganese composite oxide, a lithium-nickel oxide, a lithium-cobalt oxide, a lithium-nickel-cobalt oxide, a lithium-manganese-cobalt oxide, a lithium containing noncrystalline vanadium pentoxide, or chalcogen compounds such as titanium disulfate or molybdenum disulfate. The lithium-cobalt oxide (a part of Co in the lithium-cobalt oxide may be substituted with the metals such as transition metals, Sn, Al, Mg, T, V) is particularly advantageous as it can raise the potential of the positive electrode and hence the voltage of the battery. The positive electrode 4 is produced by preparing a mixture of the compound, an organic binder material and a conductive material, kneading the mixture into a sheet and pressing it against a current collector member.

An example of a suitable organic binder material is polytetrafluoroethylene. Examples of the conductive material are acetylene black and graphite. The current collector member may be aluminum foil, stainless steel foil or nickel foil.

One of the characteristics of the present invention is the constitution of the negative electrode. The negative electrode contains a carbonaceous material. The carbonaceous material has a layer structure more disordered than graphite and has hexagonal net faces with selective orientations. In other words, it comprises both a graphite-like or graphitoid layered structure part and a turbulenced-layered structure part. One suitable carbonaceous material is shaped into a spherical particle of which fine structures are arranged in point-orientation as the selective orientations, such as is found in a mesophase small spherical particle.

Another type of suitable carbonaceous material comprises also both a graphite-like layered structure part and a turbulenced-layered structure part. This material is shaped into a fiber having fine structures arranged in lamellar type or Brooks-Taylor type selective orientations, such as is found in mesophase pitch-like carbon.

The negative electrode 6 is formed by preparing a mixture of the carbonaceous material and an organic binder material and applying the mixture to a current collector member to coat the collector member with the mixture. An example of a suitable organic binder material is an ethylenepropylene copolymer. The current collector member may be copper foil, nickel foil or stainless steel foil.

As the index to specify the graphite-like layered structure of the carbonaceous material, the parameters of interplanar spacing of (002) surface ($d_{002}$) and mean size of the crystal lattice along the c-axis (Lc) are used effectively. Both of these parameters can be measured by means of X-ray diffraction. As the suitable carbonaceous material for the negative electrode, it is desirable that the mean value of $d_{002}$ is between 0.337–0.380 nm and the mean value of Lc is between 1–25 nm. If the values of $d_{002}$ and Lc deviate from these ranges, the lithium ion absorbing-releasing quantity of the carbonaceous material decreases due to degradation of the graphite structure and gas generation caused by reduction/decomposition of the solvent in the nonaqueous electrolyte. The specific capacity (mAh/cm$^3$) and the cycle life of the battery may be degraded The true density of the carbonaceous material can be more than about 1.7 g/cm$^3$ in the desired ranges of $d_{002}$ and Lc.

More desirable ranges for $d_{002}$ and Lc are 0.345–0.360 nm, 1–4.0 nm, respectively.

A Raman spectrum with argon laser (wavelength: 514.5 nm) is very effective to measure the ratio of the graphite-like layered structure part or turbulence-layer structure part in the carbonaceous material. In the Raman spectrum, a peak resulting from the turbulence structure appears at about 1,360 cm$^{-1}$ and a peak resulting from the graphite-like layered structure appears at about 1,580 cm$^{-1}$. Either the peak intensity ratio (e.g., the intensity ratio $R_1/R_2$, in which $R_1$ is the Raman intensity of the turbulence structure and $R_2$ is the Raman intensity of the graphite-like layered structure) or the area ratio may be used. It is desirable that the ratio between the graphite-like layered structure part and the turbulence structure part in the carbonaceous material be in the range of about 0.5–1.5 for a suitable negative electrode material. If the intensity ratio falls below 0.5, decomposition of the solvent in the nonaqueous electrolyte. If the intensity ratio exceeds 1.5, the absorbing and releasing quantity of lithium ions in the negative electrode decreases. In both cases the charge-discharge efficiency decreases. The most desirable ratio ($R_1/R_2$) is in the range of about 0.7–1.3.

A ratio of residual hydrogen caused by the non-graphitization of the carbonaceous material is specified by an atomic ratio (H/C) of hydrogen/carbon atoms. It is desirable that the H/C ratio be less than 0.15. If this H/C ratio increases above 0.15, an increase of the absorbing and releasing quantity of lithium ions may become difficult and the charge-discharge efficiency of the battery may be reduced. The most desirable value for H/C is 0.004 or less.

Figure 2A:
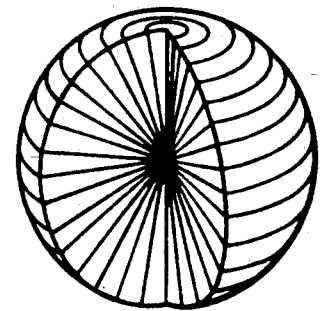
FIG. 2 is a partial vertical sectional view showing carbonaceous materials used in the present invention.
Figure 2B:
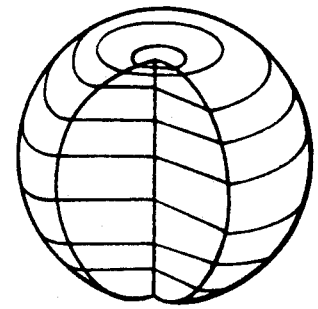
Figure 2C:
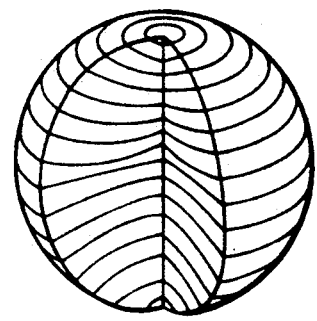

For the point oriented configuration of fine structure (configuration of crystal lattice), it is possible to model the radiant type shown in FIG. 2A, the lamellar type (layer construction type) shown in FIG. 2B and the Brooks-Taylor type aggregated by the lamellar type and radiant type shown in FIG. 2C. Definitions of the Brooks-Taylor structure, "Chemical & Physics Carbon" vol. 4, 1968, p. 243 and "Carbon" vol. 13, 1965, p. 185. Some carbonaceous materials belonging to these three type structures are mixtures of a selected orientation phase and a non-orientation phase. For example, the carbonaceous material may have a radial structure near the surface and a random structure near the center.

It is preferable that the average size of the carbonaceous material spherical particles be in the range of 0.5–100 μm, and more particularly 2–40 μm. When the average particle size is less than 0.5 μm, the spherical particles can pass the separator holes easily and short-circuiting between the positive and negative electrodes may occur. On the other hand, when the average particle size is substantially above 100 μm, the specific surfaces of the spherical particles become small and it becomes difficult to increase the absorbing and the releasing capacity of lithium ions.

It is preferable that the ratio of minor radius and major radius (minor radius/major radius) of the carbonaceous material spherical particle be more than 1/10, and particularly preferable that more than ½. When such spherical or non-spherical particles are used, homogeneous reactions of the absorbing or releasing lithium ions occur more easily. The structural and mechanical stability of the carbonaceous material is improved and the filling density of the carbonaceous material is also improved. Therefore, the cycle life and capacity of the battery can be increased by the use of such spherical particles.

The particle size distribution of the carbonaceous material spherical particles may be important. The distribution should be at least 90 volume % in the range of 0.5 μm to 30 μm radius.

In this range, the carbonaceous materials cannot pass through the separator and a densely-packed negative electrode can be made. The range of 1 μm to 20 μm is particularly preferable.

The surfaces of the carbonaceous material spherical particles or the carbon material fibers according to the invention are particularly occupied with C-axis planes (parallel to the C-axis) in the graphite structure. The lithium ions can pass through the C-axis plane easily. Therefore the absorb-discharge reaction by the movement of the lithium ions occurs effectively.

It is preferable that the carbonaceous material according this invention have an exothermic peak value of 900° C. or less in the differential thermal analysis in an air atmosphere.

Carbonaceous materials having an exothermic peak of 900° C. or less in the differential thermal analysis exhibit a property that many lithium ions are occluded in the fine structure of the carbon of random structure or graphite-like layer structure. As a result the clearance between carbons of the structure is large. Conversely, carbonaceous material for which the exothermic peak value exceeds 900° C. exhibits less occlusion and discharge of lithium ions, and the cycle life of such material is inferior. Preferably, the exothermic peak value in the range of 600° C. to 800° C.

A carbonaceous material particle with the above-described characteristics can be obtained by carbonization (for example at 600°-1500° C.) or graphitization (for example above 1500° C.) in a normal or pressurized atmosphere of an inert gas (for example argon gas) or in a vacuum by using, for example, mesophase small spherical particles, mesophase pitch, petroleum pitch, coal/tar, heavy oil, organic resin or synthesized polymer material. The carbonization should be carried out for more than one hour, and, more preferably, for 2-24 hours. In particular, carbonaceous particles of nearly spherical form can be manufactured by forming small spheres (mesophase small spherical particles of a crystalline phase having optical heterogeneous properties) from petroleum pitch, coal/tar or heavy oil during initial heat treatment at or above 350° C. and then separating and carbonizing or graphitizing the material.

Specifically, carbonaceous material such as a mesophase small spherical particle or a mesophase pitch fiber is first heat-treated at a temperature of more than 1200° C. up to 2500° C. (high-temperature treating method). Then the carbonaceous material spherical particles produced in the manner described above can be heat-treated in the presence of oxygen gas to remove the graphite layers near the surface of the particles. The effect of this treatment is to enhance the movement of lithium ions into or out of the particles and thereby improving the cycle efficiency of the secondary battery.

It is desirable that the heat treatment be carried out in a temperature range between 300° and 800° C., and more desirably, between 400° and 600° C. When the heat treatment temperature falls below 300° C., it becomes difficult to effectively eliminate oxidation of surface layers having relatively high graphitization of the spherical materials. When the heat treatment temperature exceeds 800° C., there is a possibility of burning out the carbonaceous particles. It is desirable that when heat treatment is done in atmospheric air, the said heat-treatment be continued for 1–10 hours. In this case, the heat treatment time can be reduced by elevating the oxygen partial pressure of the atmospheric air. After the heat treatment, the carbonaceous particles may be reheated to a temperature above 300° C. in an inert gas.

A low-temperature heat-treating method also may be used. In this method the carbonaceous material, such as a mesophase small spherical particles or mesophase pitch fibers is heat-treated in a temperature range of 600° C. to less than 1200° C. In this case the heat treatment in the presence of oxygen gas in the range of 300° C. to 800° C. is unnecessary because the graphitization of the spherical materials is lower than in the case of the high-temperature treating method mentioned above.

It is desirable that the ratio between the graphite-like layered structure and turbulence-layered structure of the surface layer of the carbonaceous material after heat-treatment be in the region between 0.8 and 1.4 in intensity ratio ($R_1/R_2$) of the Raman spectrograph.

The ratio of spherical particles falling between 0.7 and 1.1 before heat-treatment can be increased to about 0.05 to 0.35 by the oxidation treatment described above.

Graphitization of the carbonaceous spherical particles becomes higher at the surface thereof, and, for example, the peak intensity ratio ($R_1/R_2$), an indicating factor of the ratio between the graphite-like layered structure and turbulence-layered structure, becomes smaller relative to the inner portions of the particles. In accordance with the invention, the spherical carbonaceous particles can be used without pulverization. As a result, the graphite-like layered structure and turbulence-layered structure at the particle surface has a marked effect on the absorption and release of lithium ions and the efficiency thereof. Thus, because the surface layer of the carbonaceous particle includes a relatively high graphite structure which can withstand oxidation, it is possible to expose on the surface a layer having an optimum ratio of graphite-like layered structure and turbulence-layered structure. Also, it is possible to reject impurities or functional groups absorbed in the surface layer of the spherical particles of carbonaceous material by this heat treatment. Thus, it is possible to increase the absorption and release of lithium ions effectively, and thereby provide a higher capacity lithium secondary battery.

The carbonaceous fibers produced from mesophase pitch have a graphite-like layered structure and a turbulence-layered structure, and the orientation of the fine structure of the cross section of the fiber is a lamellar type or a Brooks-Taylor type. The ratio between the graphite-like layered structure and the turbulence-layered structure, and the atomic ratio of hydrogen/carbon of such carbonaceous fibers are the same as in the case of spherical particles, described above.

The average diameter of such carbonaceous fiber should desirably be between 1-100 micrometers and more desirably from 2-40 micrometers. When the average diameter is less than one micrometer, particles of carbon filament tend to pass through a separator and danger of short-circuits between the negative electrode and the positive electrode. If the average diameter exceeds 100 micrometers, the specific area of the carbonaceous substance becomes smaller and it increase the absorption or release of lithium ions. The average diameter of the carbon filament can be reduced effectively by means of pulverization or the like.

The average length of the carbonaceous fiber should desirably be between 1-200 micrometers and more desirably between 2-100 micrometers.

Carbonaceous material spherical particles similar to those described above also can be produced by crushing the carbonaceous fibers. The crushed surface of the spherical particles produced from such fibers has fewer layers to disturb the moving of lithium ions. Therefore, in this case, the oxidation treatment of the particles can be omitted.

The lithium ion conductive electrolyte, may be a nonaqueous electrolyte solution of lithium salt(electrolyte), such as lithium perchloride($LiClO_4$), lithium hexafluoric phosphate($LiPF_6$), lithium borate fluorate(-$LiBF_4$), lithium hexafluoride arsenide($LiAsF_6$), or lithium trifluoromethane sulfonate($LiCF_3SO_3$) in at least one non-aqueous solvent selected from a group consisting of, for example, ethylene carbonate, propylene carbonate, diethyl carbonate, $\gamma$-butyrolactone, sulpholan, acetonitrile, 1,2-dimethoxyethane, 1,2-diethoxyethane, 1,3-dimethoxypropane, dimethylether, tetrahydrofuran, and 2-methyltetrahydrofuran. It is desirable to dissolve sufficient electrolyte in a nonaqueous solvent to provide a 0.5-1.5 mol/l solution. Also, a lithium-ion conductive solid electrolyte may be used. For example, a solid polymer electrolyte of a polymer compounded with lithium salt may be used.

An electrolyte which has the compositions described hereunder is particularly preferable. Ethylene carbonate (EC) as a first composition, propylene carbonate (PC) as a second composition, an at least one compound selected from the group consisting of 1,2-dimethoxyethane (DME), 1,2-diethoxyethane (DEE), diethyl carbonate (DEC), dimethoxymethane (DMM), $\gamma$-butyrolactone ($\gamma$-BL) and tetrahydrofuran as the third composition may be combined. The mixed solvent comprising the above first, second and third composition preferably has a compounding ratio of the third composition less than 40% by volume.

The preferable electrolyte is formed by diluting 0.5 to 1.5 mol/l of lithium fluoride of intumescene ($LiBF_4$), lithium hexafluoric phosphate ($LiPF_6$) or lithium trifluoromethane sulfonate ($LiCF_3SO_3$) in the mixed solvent described above.

The third composition in the mixed solvent increases the conductivity of the nonaqueous electrolytic solution, enabling battery operation at high current. If the compounding ratio of the third composition exceeds 40 volume %, the carbonaceous sintered material of the negative electrode deteriorates. The preferable compounding ratio of the third composition is 5 to 25 volume %. Furthermore, it is desirable that the composition ratio of the three compositions be 20 to 80 volume % for the EC, 10 to 60 volume % for the PC and less than 40 volume % for the third composition. The preferable ranges are 30 to 60% for the EC, 20 to 50% for the PC and 5 to 25% for the third composition.

Moreover, when the solvent includes EC, PC and the third composition at the desired compounding ratio, deterioration of the carbonaceous sintered material of the negative electrode is avoided and the high capacity of the negative electrode can effectively be drawn out.

The volume of solution of the mixed solvent of $LiBF_4$ and $LiPF_6$ or $LiCF_3SO_3$ preferably is limited to 0.5 to 1.5 mol/l outside of this range the conductivity and stability of the electrolytic solution is reduced The preferable volume of solution of the electrolyte is 0.7 to 1.2 mol/l.

Furthermore, by selecting the $LiBF_4$, $LiPF_6$ or $LiCF_3SO_3$ and maintaining the volume of solution of the mixed solvent in the specified range, the resulting electrode can be made stable against a potential of more than 4V. The chemical stability of the nonaqueous electrolytic solution is also beneficial in case of the lithium cobalt oxide of the positive electrode, contributing to the long life of the battery. In particular, reaction of $LiBF_4$ with the lithium cobalt series oxides can be avoided.

In the following, an embodiment is described with reference to FIG. 1 in which this invention is applied to a cylindrical secondary battery including nonaqueous solvent.

EMBODIMENT 1

In FIG. 1, a cylindrical stainless steel vessel 1 includes a bottom on which an insulating body 2 is mounted. In the vessel, an electrode group 3 is accommodated. The electrode group 3 has a ribbon-like structure including alternating layers of positive electrode 4, separator 5 and negative electrode 6 in this order wound spirally so as to position negative electrode 6 on the outside thereof.

The positive electrode 4 is formed by mixing 80 weight % lithium-cobalt oxide($LiCoO_2$) powder 15 weight % acetylene black and 5 weight % polytetrafluoroethylene powder. A sheet-like member formed from the mixture is press-fit to a metal collector. The separator 5 is a porous polypropylene film.

The negative electrode 6 is made by mixing 2 weight % ethylene-propylene copolymer and 98 weight % of spherical carbonaceous particles having an average particle size of 10 micrometers and having a fine structure of lamellar (thin layered) point orientation. The spherical particles are formed by carbonizing mesophase small spherical particles at 1400° C. separated from heat-treated pitch, and coating the mixture on a stainless steel foil comprising the collector at a coating quantity of 10 mg/cm². For this embodiment, the parameters, $d_{002}$ and Lc measured by X-ray diffraction, the ratios of Raman intensity $R_1/R_2$ measured using an argon laser light source and the atomic ratio of hydrogen/carbon (H/C) are shown in Table 1.

In the vessel 1, an electrolytic solution is provided by dissolving lithium hexafluoric phosphate($LiPF_6$) with a mixed solvent (mixing ratio in volume %, 25:25:50) of ethylene carbonate, propylene carbonate and 1,2-dimethoxyethane. An insulating paper 7 having central hole is mounted on the electrode group 3. Further, in an upper opening portion of the vessel 1, an insulative sealing plate 8 is mounted in a liquid tight manner by means of, for example, a caulking process. A positive electrode terminal 9 is fitted in a central portion of the insulative sealing plate 8. This positive electrode terminal 9 is connected to the positive electrode 4 of the electrode group 3 via an positive electrode lead 10. Also, negative electrode 6 of the electrode group 3 is connected to the vessel 1 as a negative terminal via a negative electrode lead (not shown).

EMBODIMENTS 2-6; COMPARATIVE EXAMPLE 1

Several other lithium secondary batteries (2-6) were made using techniques similar to embodiment 1, but having various carbonaceous materials exhibiting the values of parameters shown in Table 1.

In addition, as a comparative example, a lithium secondary battery was produced using 98 weight % of non orientated (random) carbonaceous material spherical particles as the negative electrode material.

TABLE 1

| Embodiment Com. Example | Structure | Mean Diameter (nm) | $d_{0002}$ (nm) | Lc (nm) | $R_1/R_2$ | H/C | D.T. Analysis °C. |
|---|---|---|---|---|---|---|---|
| Em | | | | | | | |
| 1 | lamellar | 10 | 0.3508 | 2.50 | 1.10 | 0.003 | 687 |
| 2 | lamellar | 10 | 0.3452 | 2.50 | 1.00 | 0.003 | 721 |
| 3 | lamellar | 20 | 0.3410 | 5.00 | 0.75 | 0.001 | 795 |
| 4 | lamellar | 5 | 0.3470 | 2.00 | 0.95 | 0.003 | 711 |
| 5 | lamellar | 60 | 0.3508 | 2.20 | 1.10 | 0.003 | 687 |
| 6 | radiant | 5 | 0.3508 | 2.20 | 1.10 | 0.001 | 687 |
| Com. Ex | | | | | | | |
| 1 | random | 10 | 0.3410 | 2.60 | 1.15 | 0.003 | 726 |

The batteries of embodiments 1-6 and comparative example 1 were then repeatedly charged at 50 mA to 4.2 volts and discharged at 50 mA to 2.5 volts the discharge capacities and cycle times were measured. The results are shown in FIG. 3.

Figure 3:
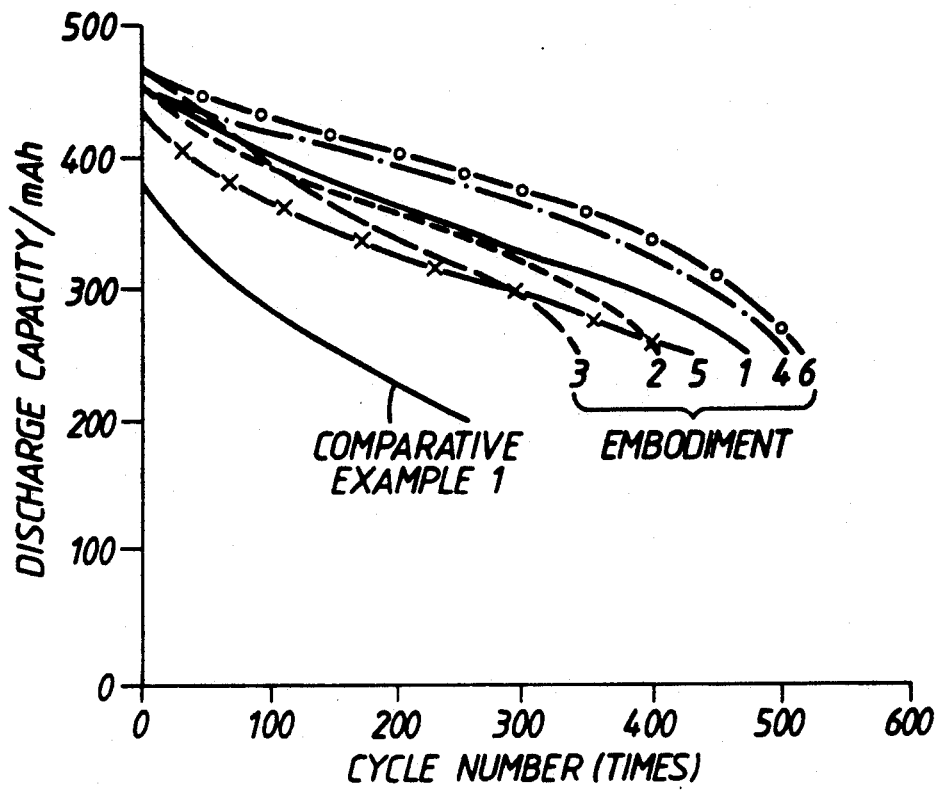
FIG. 3 to FIG. 9 are graphs showing charge and discharge capacities as functions of cycle numbers in lithium secondary batteries of the embodiments and comparative examples set forth in Tables 1-7 of this application.

As is apparent from FIG. 3, the lithium secondary batteries of embodiments 1-6 display markedly improved capacity and cycle life relative to comparative example 1. In particular, embodiments 1, 4 and 6 showed excellent capacity and cycle life.

EMBODIMENT 7

A lithium secondary battery of the same construction as that of embodiment 1 was prepared except that the negative electrode structure was modified. The negative electrode was formed mixing 98 weight % of carbonaceous particles having a minor diameter/major diameter ratio of ⅔ or above, an average particle size of 10 micrometers and a Brooks-Taylor type point oriented fine structure with 2 weight % of ethylene propylene copolymer. The carbonaceous particles were made by carbonization of mesophase small spherical particles at 1300° C. separated from heat-treated coal tar. The mixture was coated on a stainless steel foil collector using a quantity of 10 mg/cm². The parameters of this carbonaceous particle were shown in Table 2.

EMBODIMENTS 8-11

Lithium secondary batteries were made similar to embodiment 7 using carbonaceous materials having parameters also shown in Table 2.

Figure 4:
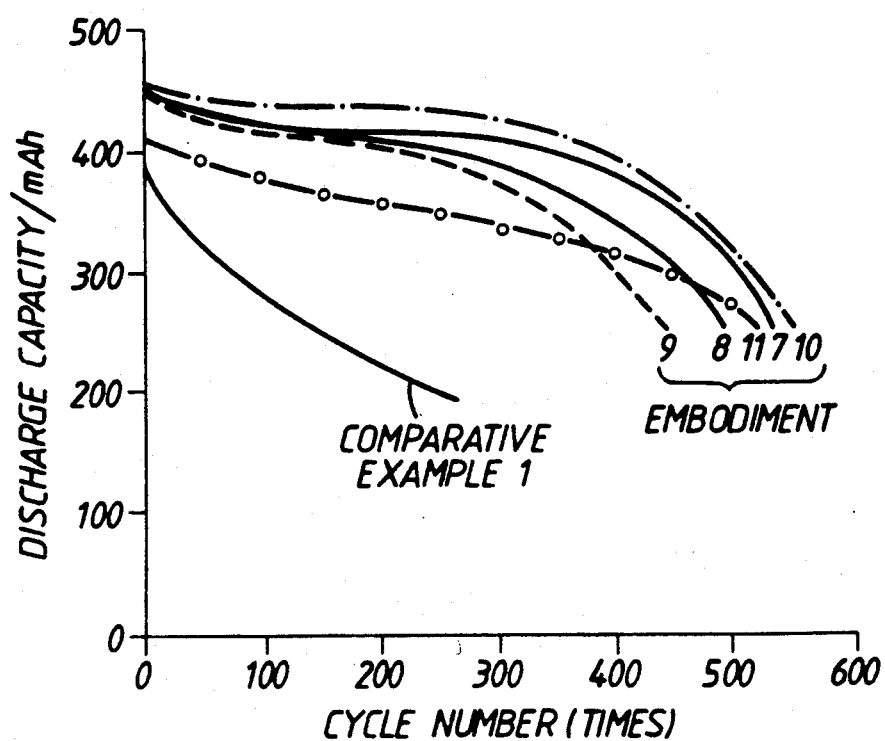

Then, the batteries of embodiments 7-11 were repeatedly charged at 50 mA to 4.2 volts and discharged at 50 mA to 2.5 volts discharge capacities and cycle times were measured. The results are shown in FIG. 4. Further, in FIG. 4, measured results of cycle life and discharge capacity for the comparative example are illustrated.

As is apparent from FIG. 4, the lithium secondary batteries of the embodiments 7-11 have markedly improved capacity and cycle life relative to comparative example 1. In particular, embodiments 7 and 10 have excellent capacity and cycle life.

EMBODIMENT 12

A lithium secondary battery of the same construction as that of embodiment 1 was prepared. However, the negative electrode was prepared by mixing 98 weight % of carbonaceous particles of an average particle size of 10 micrometers and having a Brooks-Taylor type orientation of the fine structure of the cross section of a carbon fiber made by carbonization of mesophase pitch at 1600° C. with 2 weight % of ethylene propylene copolymer. This mixture was coated on a stainless steel foil collector using a quantity of 10 mg/cm². The parameters of these carbonaceous particles are shown in Table 3.

EMBODIMENTS 13-15; COMPARATIVE EXAMPLE 2

Lithium secondary batteries were prepared similar to embodiment 7 using the carbonaceous materials having the parameters shown in Table 3.

In embodiment 13, spinel type structured lithium-manganese oxide ($Li_xMn_2O_4$) was used as the positive electrode material instead of lithium cobalt-oxide (Li-

TABLE 2

| Embodiment Com. Example | Structure | Mean Diameter (nm) | $d_{002}$ (nm) | Lc (nm) | $R_1/R_2$ | H/C | D.T. Analysis °C. |
|---|---|---|---|---|---|---|---|
| Em | | | | | | | |
| 7 | B-Taylor | 10 | 0.3500 | 2.20 | 1.10 | 0.002 | 680 |
| 8 | B-Taylor | 20 | 0.3452 | 2.50 | 1.00 | 0.003 | 721 |
| 9 | B-Taylor | 10 | 0.3410 | 5.00 | 0.75 | 0.003 | 742 |
| 10 | B-Taylor | 5 | 0.3560 | 2.00 | 0.95 | 0.003 | 748 |
| 11 | B-Taylor | 100 | 0.3452 | 2.50 | 1.00 | 0.003 | 785 |

$CoO_2$).

TABLE 3

| Embodiment Com. Example | Structure | Mean Diameter (nm) | $d_{002}$ (nm) | Lc (nm) | $R_1/R_2$ | H/C | D.T. Analysis °C. |
|---|---|---|---|---|---|---|---|
| Em | | | | | | | |
| 12 | B-Taylor | 10* | 0.3480 | 3.00 | 0.88 | 0.001 | 712 |
| 13 | B-Taylor | 5* | 0.3490 | 2.80 | 0.90 | 0.003 | 720 |

TABLE 3-continued

| Embodiment Com. Example | Structure | Mean Diameter (nm) | $d_{002}$ (nm) | Lc (nm) | $R_1/R_2$ | H/C | D.T. Analysis °C. |
|---|---|---|---|---|---|---|---|
| 14 | lamellar | 10* | 0.3500 | 2.80 | 0.91 | 0.003 | 715 |
| 15 | lamellar | 20* | 0.3680 | 1.20 | 1.10 | 0.003 | 680 |
| Com. Ex 2 | random | 20* | 0.3600 | 2.50 | 1.40 | 0.003 | 660 |

*minor diameter

The batteries of embodiments 12-15 and comparative example 2 were repeatedly charged at 50 mA to 4.2 volts and discharged at 50 mA to 2.5 volts the discharge capacities and cycle life and discharge capacity were measured. The results are shown in FIG. 5.

Figure 5:
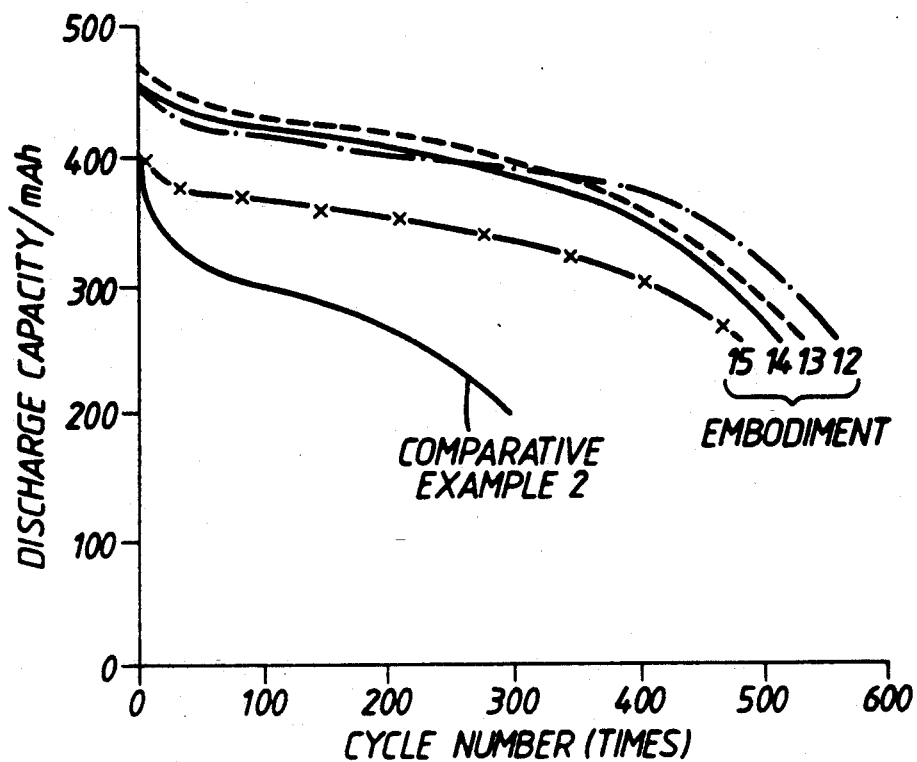

As is apparent from FIG. 5, the lithium secondary batteries of the embodiments 12-15 have markedly improved capacity and cycle life relative to comparative example 2. In particular, embodiments 12, 13 and 14 have excellent capacity and cycle life.

EMBODIMENT 16

A lithium secondary battery of the same construction as that of embodiment 1 was prepared except that a different negative electrode was used The negative electrode was made by mixing 98 weight % of carbonaceous particles having an average particle size of 10 micrometers with 2 weight % of ethylene propylene copolymer and a lamellar type (thin layer type) orientation of fine structure. The particles were made by carbonization of mesophase small spherical particles at 1400° C. separated from heat-treated pitch The heat treatment was at 500° C. for 5 hours in air. The resulting mixture was coated on a stainless steel foil collector using a quantity of 10 mg/cm². In this case, the carbonaceous particles before heat treatment had various parameters as shown in Table 4.

In this embodiment, lithium-nickel-oxide ($LiNiO_2$) was used as the positive electrode material, instead of $LiCoO_2$.

EMBODIMENTS 17-19

Lithium secondary batteries were prepared similar to embodiment 16 using heat-treated carbonaceous materials as shown in Table 4.

In these embodiments, lithium-cobalt oxide ($LiCoO_2$) was used as the positive electrode material.

cal carbonaceous particles. In particular, embodiments 16 and 17 have excellent capacity and cycle life.

Further, although embodiments 16-19 used spherical carbonaceous particles of lamellar type point orientation as the negative electrode material, lithium secondary batteries with negative electrode materials using spherical carbonaceous particles of radiant and Brooks-Taylor type orientation also are able to achieve the same capacity increases.

EMBODIMENT 20

A positive electrode was prepared similar to embodiment 1. A negative electrode 6 was prepared using carbonaceous material made by burning mesophase small spherical particles, which had been thermally treated and separated from coal tar pitch, in argon gas at 1000° C. The range of particle size distribution of the carbonaceous material obtained was 1^mm to 15^mm, and the average particle diameter was 5^mm. The negative electrode was obtained by mixing 98% weight of the carbonaceous materials particles with 2% weight ethylene propylene copolymer applying this mixture in a quantity of 10 mg/cm² to a stainless steel foil collector. The parameters of the carbonaceous material in this embodiment are shown in Table 5.

Vessel 1 was provided with electrolyte formed by diluting 0.1 mol/l of lithium hexafluoric phosphate ($LiPF_6$) in a mixed solvent of propylene carbonate, ethylene carbonate and 1,2-dimethoxyethane (25:25:50 of mixture volume ratio).

EMBODIMENTS 21-23, COMPARATIVE EXAMPLES 3-5

Positive electrodes were made similar to embodiment 20. Negative electrodes were prepared using carbonaceous materials with the parameters shown in Table 5.

In the case of comparative example 4, the carbona-

TABLE 4

| Embodiment Com. Example | Structure | Mean Diameter (nm) | $d_{002}$ (nm) | Lc (nm) | $R_1/R_2$ | H/C | D.T. Analysis °C. |
|---|---|---|---|---|---|---|---|
| Em | | | | | | | |
| 16 | lamellar | 10 | 0.3508 | 2.50 | 1.1→1.2** | 0.003 | 695 |
| 17 | lamellar | 10 | 0.3480 | 2.40 | 1.0→1.1 | 0.003 | 706 |
| 18 | lamellar | 10 | 0.3450 | 3.00 | 0.85→1.0 | 0.003 | 765 |
| 19 | lamellar | 10 | 0.3420 | 4.20 | 0.75→0.9 | 0.003 | 789 |

**after thermal treated

Figure 6:
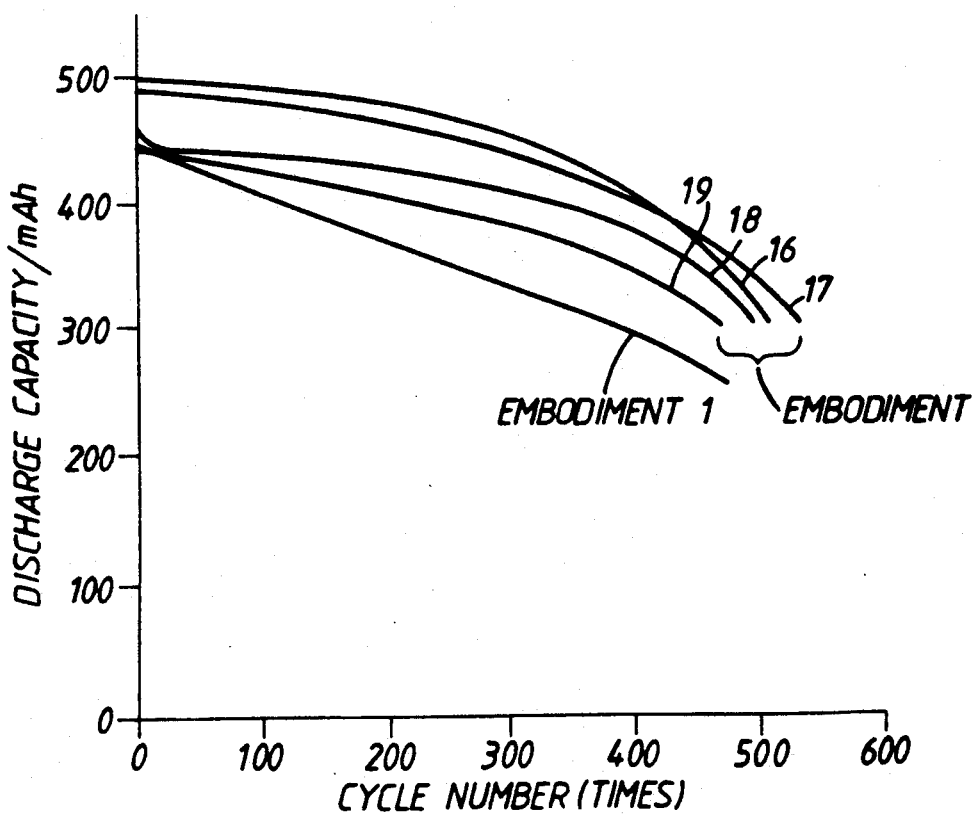

The batteries of embodiments 16-19 were repeatedly charged at 50 mA to 4.2 volts and discharged at 50 mA to 2.5 volts the cycle life and discharge capacity were measured. The results are shown in FIG. 6. Further, in FIG. 6, measured results of cycle life and discharge capacity for embodiment 1 are shown.

As is apparent from FIG. 6, the lithium secondary batteries of the embodiments 16-19 have a larger capacity and cycle life relative to embodiment 1 in which the negative electrode material had no heat-treated sphericeous material was obtained from a thermally treated furfuryl alcohol resin.

In the case of comparative example 5, the particle size distribution is in the range of 15 to 40^mm diameter at 90% or more.

Comparative examples 3 and 4 are provided for purposes of demonstrating the effects of varied $d_{002}$ and Lc values. However, it is noted that both of these examples are within the scope of the presently claimed invention.

Thus, both constitute further embodiments as well as comparative examples.

TABLE 5

| Embodiment Com. Example | Structure | Mean Diameter (nm) | $d_{002}$ (nm) | Lc (nm) | $R_1/R_2$ | D.T. Analysis °C. |
|---|---|---|---|---|---|---|
| Em | | | | | | |
| 20 | B-Taylor | 5 | 0.3550 | 1.50 | 1.2 | 670 |
| 21 | B-Taylor | 5 | 0.3540 | 1.30 | 1.3 | 605 |
| 22 | B-Taylor | 5 | 0.3570 | 1.60 | 1.25 | 675 |
| 23 | B-Taylor | 5 | 0.3550 | 1.50 | 1.28 | 621 |
| Com. Ex | | | | | | |
| 3 | B-Taylor | 5 | 0.3440 | 2.60 | 0.9 | 790 |
| 4 | random | 5 | 0.3850 | 1.20 | 1.5 | 684 |
| 5 | B-Taylor | 26 | 0.3550 | 1.50 | 1.2 | 670 |

The lithium secondary batteries in embodiments 20 through 23 and comparative examples 3 and 4 were repeatedly charged up to 4.2 volts and discharged to 2.5 volts at 50 mA of current. The discharge capacity and cycle life of each battery were measured. The results are shown in FIG. 7.

Figure 7:
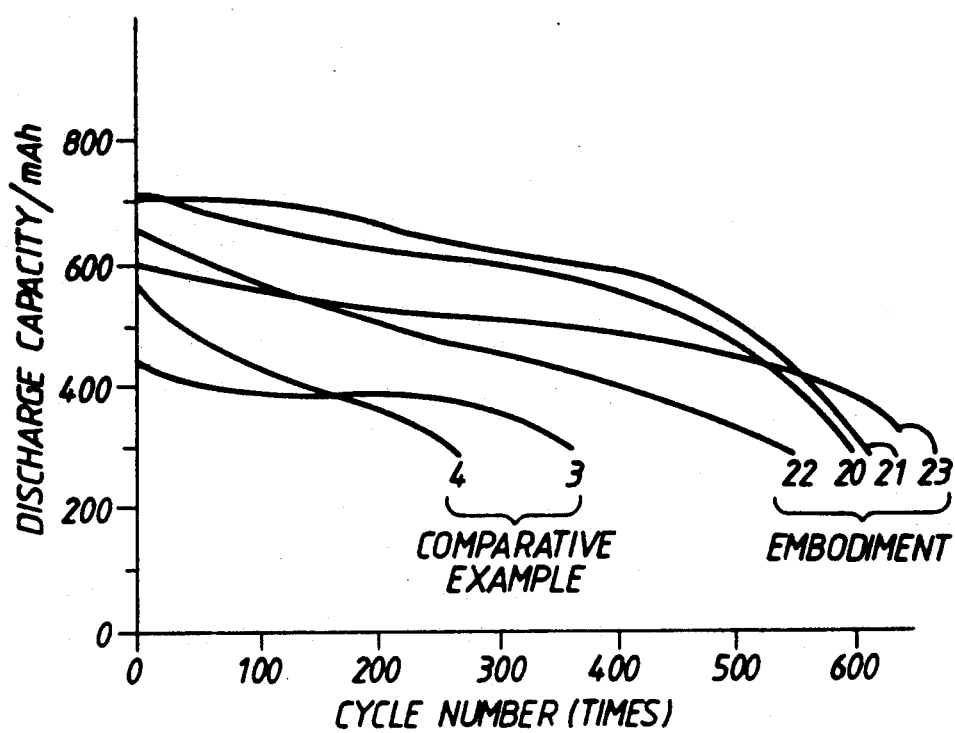

As is clear from FIG. 7, in the lithium secondary batteries of embodiments 20 through 23, capacities have been increased and cycle lives has been improved in a marked way in comparison with the batteries in comparative examples 3 and 4.

In the case of comparative example 5, since carbonaceous material of large particle diameter was pulverized and fine pieces were produced, the positive electrode short-circuited, and the battery was not able to function. Furthermore, the packing density of the negative electrode was lowered by 10% in comparison with embodiment 20.

EMBODIMENT 24

A positive electrode was prepared similar to embodiment 7. A negative electrode 6 was prepared in the manner described below. Carbonaceous sintered material particles were obtained by carbonizing the mesophase small spherical particles (average particle diameter: 6^mm) at 1000° C. in argon gas. The mesophase small spherical particles had been thermally treated and separated from coal tar pitch. The sintered material particles (98% by weight) were mixed with 2% by weight ethylene propylene copolymer. The resulting mixture was applied in a volume of 10 mg/cm² to a stainless steel foil collector.

The parameters of the carbonaceous material in this embodiment are shown in Table 6.

TABLE 6

| Embodiment Com. Example | Structure | Mean Diameter (nm) | $d_{002}$ (nm) | Lc (nm) | $R_1/R_2$ | D.T. Analysis °C. |
|---|---|---|---|---|---|---|
| Em | | | | | | |
| 24~27 | B-Taylor | 6 | 0.3550 | 1.65 | 1.2 | 680 |
| 28 | B-Taylor | 10 | 0.3550 | 1.55 | 1.1 | 690 |
| Com. Ex | | | | | | |
| 6,7 | lamellar | 10 | 0.3580 | 2.50 | 1.1 | 687 |

In vessel 1, a nonaqueous electrolytic solution made by diluting lithium fluoride of intumescene (LiBF$_4$) at 1.0 mol/l in a mixed solvent of ethylene carbonate, propylene carbonate and 1,2-dimethoxyethane (40:40:20 mixing volume ratio) was placed.

EMBODIMENT 25

This embodiment was prepared the same as embodiment 24, except that 1.0 mol/l of lithium hexafluoric phosphate (LiPF$_6$) was diluted in a mixed solvent of ethylene carbonate, propylene carbonate and 1,2-dimethoxyethane (40:40:20 of mixed volume ratio).

EMBODIMENT 26

This embodiment was prepared the same as embodiment 24, except that 1.0 mol/l of lithium trifluoromethane sulfonate (LiCF$_3$SO$_3$) was diluted in a mixed solvent of ethylene carbonate, propylene carbonate and 1,2-dimethoxyethane (40:40:20 of mixed volume ratio).

EMBODIMENT 27

This embodiment was prepared the same as embodiment 24, except that 1.0 mol/l of lithium hexafluoric phosphate (LiPF$_6$) was diluted in a mixed solvent of ethylene carbonate, propylene carbonate and diethyl carbonate (40:40:20 of mixed volume ratio).

EMBODIMENT 28

This embodiment was prepared the same as embodiment 24, except that carbonaceous fiber was obtained by carbonizing a mesophase pitch fiber separated from petroleum pitch at 1000° C. in argon gas. The resulting fibers were pulverized to 10^mm of average particle diameter. The pulverized fiber was mixed at 98% by weight with 2% by weight of an ethylene propylene copolymer. The mixture was applied in a volume of 10 mg/cm² to a stainless steel foil collector. In this respect, the carbonaceous fiber had a radial crystallite orientation property at the surface side and a random structure at the central part.

The parameters of these carbonaceous materials are shown in Table 6.

COMPARATIVE EXAMPLE 6

This embodiment was prepared the same as embodiment 24, except that 1.0 mol/l lithium perchlorate (LiClO$_4$) as the nonaqueous electrolytic solution was diluted in the mixed solvent of propylene carbonate and 1,2-dimethoxyethane (50:50 of mixed volume ratio).

COMPARATIVE EXAMPLE 7

This embodiment was prepared the same as embodiment 24, except that 1.0 mol/l lithium hexafluoric phosphate (LiPF$_6$) was diluted in the mixed solvent of propylene carbonate and tetrahydrofuran (50:50 of mixed volume ratio).

The lithium secondary batteries in these embodiments 24 through 28 and comparative examples 6 and 7 were repeatedly charged up to 4.2V at 50 mA of charging current discharged to 2.5V at 50 mA of current, and the discharge capacity and cycle life of the batteries were measured. The results are shown in FIG. 8.

Figure 8:
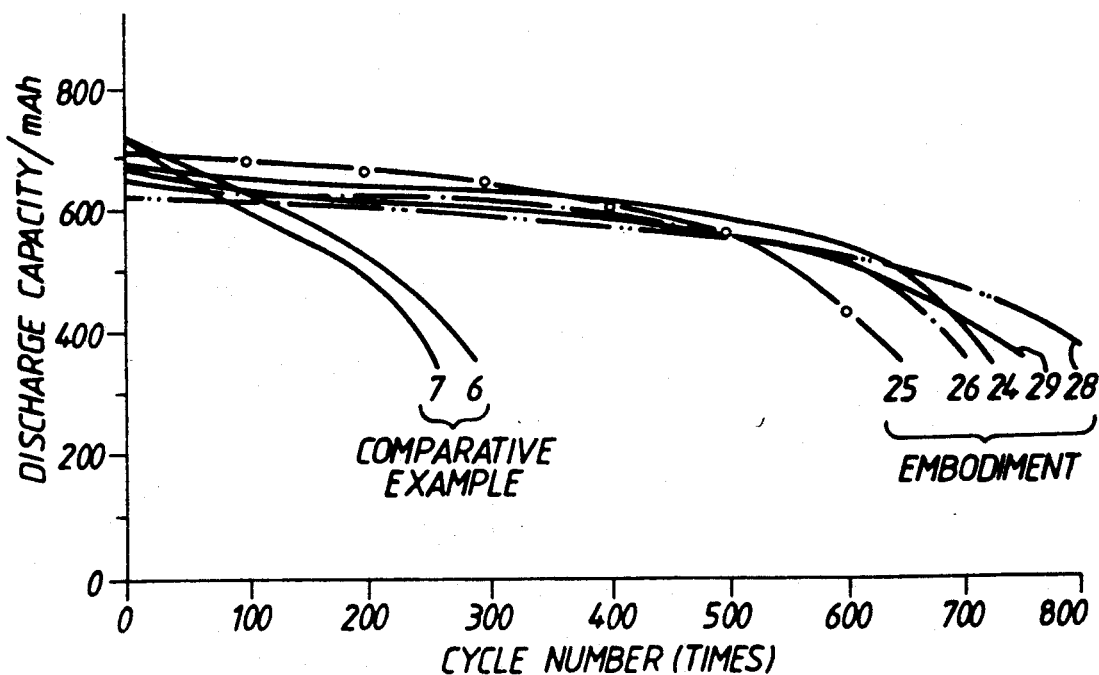

As is clear from FIG. 8, for the lithium secondary batteries in embodiments 24 through 28, capacities increased and cycle lives remarkably improved in comparison with the batteries in the comparative examples 6 and 7.

Comparative examples 6 and 7 are provided to demonstrate the effects of changing the composition of the electrolyte. Both of these examples also constitute additional embodiments of the invention, since they are within the scope of the invention, as claimed.

EMBODIMENT 29

A positive electrode was prepared similar to that of embodiment 7.

A negative electrode was prepared in the manner described below. First, 98 weight % of carbonaceous particles of an average particle size of 10 micrometers were mixed with 2 weight % of ethylene propylene copolymer. The particles had a lamellar type (thin layer type) orientation of fine structure which was provided by carbonization of mesophase small particles in an argon gas flow at 1400° C. The mesophase particles were separated from heat-treated pitch. Second, the mixed particles and copolymer were coated onto a stainless steel foil collector in a quantity of 10 mg/cm$^2$.

The parameters of the carbonaceous particles in this embodiment are shown in Table 7.

TABLE 7

| Embodi- ment Com. Example | Structure | Mean Diameter (nm) | $d_{002}$ (nm) | Lc (nm) | $R_1/R_2$ | H/C | D.T. Analysis °C. |
|---|---|---|---|---|---|---|---|
| Em 29~32 | lamellar | 10 | 0.3508 | 2.50 | 1.1 | 0.013 | 687 |
| Com. 8,9 | lamellar | 10 | 0.3508 | 2.50 | 1.1 | 0.013 | 687 |

A nonaqueous electrolytic solution made by diluting lithium hexafluoric phosphate (LiPF$_6$) at 1.0 mols/l in a mixed solvent of ethylene carbonate, propylene carbonate and 1,2-dimethoxyethane (40:40:20 of mixing volume ratio) was placed in the vessel 1.

EMBODIMENT 30

This embodiment was prepared the same as embodiment 7, except that 1.0 mol/l lithium hexafluoric phosphate (LiPF$_6$) was diluted in a mixed solvent of ethylene carbonate, propylene carbonate and 1,2-diethoxyethane (40:40:20 of mixing volume ratio).

EMBODIMENT 31

This embodiment was prepared the same as embodiment 7, except that 1.0 mol/l lithium hexafluoric phosphate (LiPF$_6$) was diluted in a mixed solvent of ethylene carbonate, propylene carbonate and tetrahydrofuran (40:40:20 of mixing volume ratio).

EMBODIMENT 32

This embodiment was prepared the same as embodiment 7, except that 1.0 mol/l lithium hexafluoric phosphate (LiPF$_6$) was diluted in the mixed solvent of ethylene carbonate, propylene carbonate and diethyl carbonate (40:30:30 of mixing volume ratio).

COMPARATIVE EXAMPLE 8

This embodiment was prepared the same as embodiment 7, except that 1.0 mol/l lithium hexafluoric phosphate (LiPF$_6$) was diluted in the mixed solvent of propylene carbonate and 1,2-dimethoxyethane (50:50 of mixing volume ratio).

COMPARATIVE EXAMPLE 9

This embodiment was prepared the same as embodiment 7, except that 1.0 mol/l lithium hexafluoric phosphate (LiPF$_6$) was diluted in the solvent of propylene carbonate.

The lithium secondary batteries in these embodiments 29 through 32 and comparative examples 8 and 9 were repeatedly charged up to 4.2 v at 50 mA of charging current and discharged to 2.5 v at 50 mA of current, and the discharge capacity and cycle life of the batteries were measured. The results are shown in FIG. 9.

Figure 9:
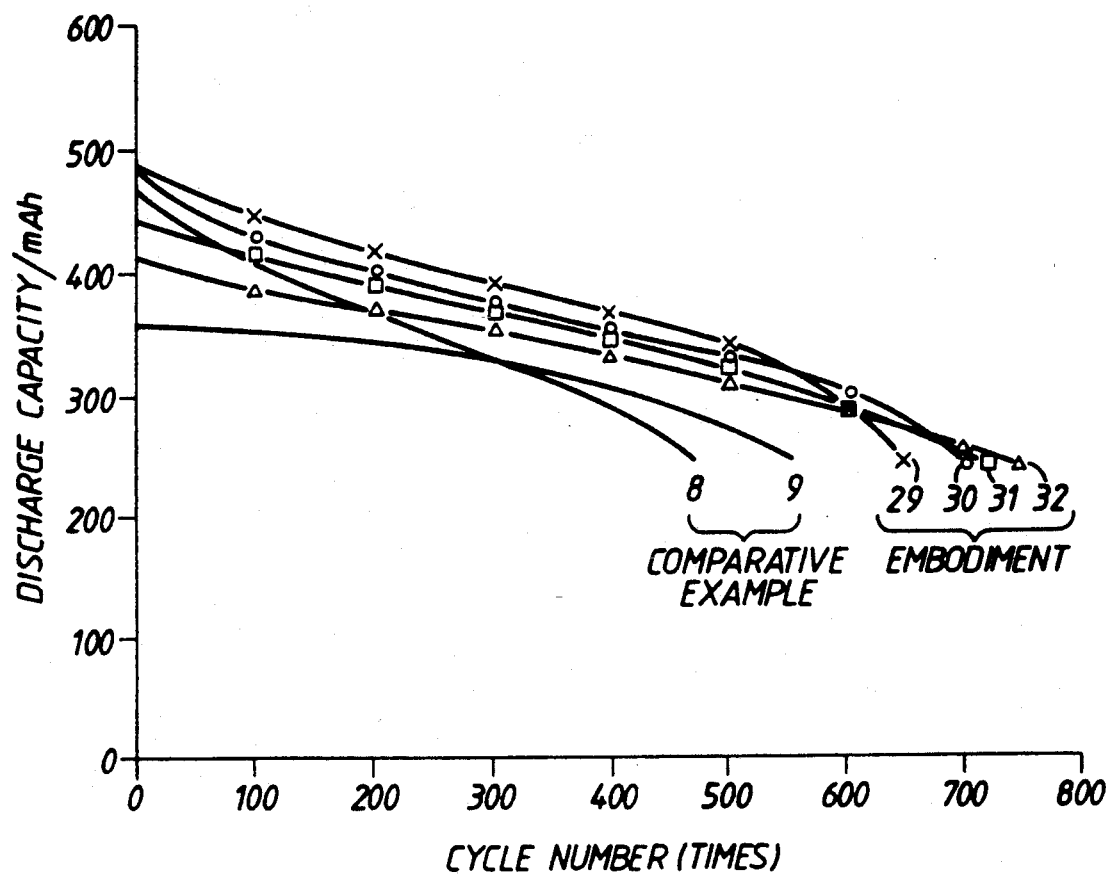

As is clear from FIG. 9, in lithium secondary batteries of these embodiments 29 through 32, capacities increased and cycle lives remarkably improved in comparison with the batteries in comparative examples 8 and 9.

Then, charging at 50 mA to 4.2 volts and discharging at 50 mA to 2.5 volts were repeated for the lithium secondary batteries of embodiments 16–19 and cycle life and discharge capacity were measured. The results are shown in FIG. 6. Further, in FIG. 6, measured results of same cycle life and discharge capacity for embodiment 1 is shown.

As is apparent from FIG. 6, it is appreciated that the lithium secondary batteries of the embodiments 16–19 have larger capacity and cycle life relative to embodiment 1 provided with a negative electrode having no heat-treated spherical carbonaceous particles.

Further, although spherical carbonaceous particles of lamellar type point orientation were used as the negative electrode material in embodiments 16–19 lithium secondary batteries with a negative electrode using spherical carbonaceous particles of radiant and Brooks-Taylor type orientation should also achieve similar capacity increase.

In a lithium secondary battery in accordance with the invention, it is possible to increase absorption and release of lithium ions, to suppress deterioration of formation-structure during the charge-discharge cycle and increase the specific capacity (mAh/cc) of the negative electrode by increasing volumetric density. By providing point orientation to radiant, lamellar or Brooks-Taylor type materials, it is possible to increase lithium ion absorption and release. Thus, by housing such a negative electrode with a positive electrode and a nonaqueous electrolyte in a vessel, a lithium secondary battery of high capacity and long charge-discharge cycle life can be achieved.

When a negative electrode is formed using carbonaceous particles having the interplanar spacing the interplanar spacing between (002) planes ($d_{002}$) and crystal lattice size (Lc) along C-axis obtained by X-ray diffraction ranging from 0.337 to 0.380 nm and 1 and 25 nm, respectively, and a Raman intensity ratio ($R_1/R_2$) of 1,360 cm$^{-1}$($R_1$) and 1,580 cm$^{-1}$($R_2$) of 0.5–1.5 measured by an argon laser light source, it is possible to greatly increase the lithium ion absorption-release quantity, to suppress deterioration of the formation-structure during the charge-discharge cycle and to suppress decomposition of the solvent in the nonaqueous electrolyte. Further, when the average particle diameter of the carbonaceous particles is between 1 and 100 micrometers, absorption and release of lithium ions by the negative electrode can be further increased. Thus, by using such a negative electrode in a vessel with a nonaqueous electrolyte, it is possible to provide a lithium secondary battery of much higher capacity and much longer charge-discharge cycle life.

Also, using a negative electrode comprised of carbon filaments or fibers including graphite-like layered structure and turbulence layered structure and having an orientation of fine structure of lamellar type or Brooks-Taylor type, increases absorption and release of lithium ion quantity and suppresses deterioration of formation-structure during the charge/discharge cycle. Thus, it is possible to provide a lithium secondary battery of high capacity and long charge-discharge cycle life by utilizing such a negative electrode with and a positive electrode and a nonaqueous electrolyte. Moreover, when the negative electrode is made with carbonaceous particles having the characteristics described herein, decomposition of the solvent in the nonaqueous electrolyte can be suppressed.

The present invention has been described with respect to specific embodiments. However, other embodiments based on the principles of the present invention should be obvious to those of ordinary skill in the art. Such embodiments are intended to be covered by the claims.

We claim:

1. A lithium secondary battery, comprising:
   a vessel;
   a positive electrode containing an active material housed in the vessel;
   a lithium ion conductive electrolyte in the vessel; and
   a negative electrode arranged in the vessel containing carbonaceous material spherical particles as active materials that absorb and discharge lithium ions, the carbonaceous material spherical particles containing a graphitoid layered structure part and a turbulence-layered structure part, fine structures of the carbonaceous material spherical particle being arranged in point-orientation.

2. The battery of claim 1, wherein the mean value of the (002) face distance ($d_{002}$) in the carbonaceous material spherical particle is 0.337 nm to 0.380 nm.

3. The battery of claim 1, wherein the mean size of the crystal lattice (LC) along the C-axis in the spherical particle is 1 nm to 25 nm.

4. The battery of claim 1, wherein the Raman spectrum ratio $R_1/R_2$ of the spherical particles is in the range of 0.5 to 1.5 where:
   $R_1$ is a peak value at $1,360^{-1}$ cm, and
   $R_2$ is a peak value at $1,580^{-1}$ cm.

5. The battery of claim 1, wherein the atomic ratio of hydrogen to carbon (H/C) in the spherical particles is less than 0.15.

6. The battery of claim 1, wherein the average size of the spherical particles is in the range of 0.5 $\mu$m to 100 $\mu$m.

7. The battery of claim 1, wherein the ratio of the minor radius and the major radius of the spherical particles is at least 1/10.

8. The battery of claim 1, wherein the spherical particles have an exothermic peak at 900° C. or less measured by differential thermal analysis.

9. A lithium secondary battery, comprising:
   a vessel;
   a positive electrode containing an active material housed in the vessel;
   a lithium ion conductive electrolyte in the vessel; and,
   a negative electrode arranged in the vessel containing carbonaceous material fibers as active materials that absorb and discharge lithium ions, the carbonaceous material fibers containing a graphitoid layered structure part and a turbulence-layered structure part both having fine structures arranged in at least one of (a) a lamellar type structure and (b) a Brooks-Taylor type structure defined by a combination of lamellar and radiant type structures or by a radial crystallite orientation surface property and a random central structure.

10. The battery of claim 9, wherein the mean value of the (002) face distance ($d_{002}$) in the carbonaceous material fibers is 0.337 nm to 0.380 nm.

11. The battery of claim 9, wherein the mean size of the crystal lattice (Lc) along the C-axis direction in the fibers is 1 nm to 25 nm.

12. The battery of claim 9, wherein the Raman spectrum ratio $R_1/R_2$ of the fibers is in the range of 0.5 to 1.5 where;
   $R_1$ is a peak value at $1,360^{-1}$ cm, and
   $R^2$ is a peak value at $1,580^{-1}$ cm.

13. The battery of claim 9, wherein the atomic ratio of hydrogen/carbon (H/C) of the fibers is less than 0.15.

14. The battery of claim 9, wherein the average size of the diameter of the fibers is in the range of 1 $\mu$m to 100 $\mu$m and the average size of the length of the fibers is in the range of 1 $\mu$m to 200 $\mu$m.

15. The battery of claim 9, wherein the fibers have an exothermic peak at 900° C. or less measured by differential thermal analysis.

16. The battery of claim 1 or claim 9 alternatively, wherein the lithium ion conductive electrolyte contains a solvent including ethylene carbonate, propylene carbonate and at least one compound selected from the group consisting of 1,2-dimethoxyethane, 1,2-diethoxyethane, diethyl carbonate, dimethoxymethane, $\gamma$-butyrolactone and tetrahydrofuran, and an electrolytic salt selected from the group consisting of lithium borofluoride, lithium phosphate hexafluoride and lithium trifluorometasulfonate.

17. The battery of claim 16, wherein the ratio of at least one compound in the solvent is 40 volume % or less.

18. The battery of either of claims 1 or 9, wherein the lithium ion conductive electrolyte contains at least one nonaqueous solvent selected from a group consisting of ethylene carbonate, propylene carbonate, diethyl carbonate $\gamma$-butyrolactone, sulpholan, acetonitrile, 1,2-dimethoxyethane, 1,2-diethoxyethane, 1,3-dimethoxypropane, dimethylether, tetrahydrofuran and 2-methyltetrahydrofuran.

* * * * *

UNITED STATES PATENT AND TRADEMARK OFFICE
CERTIFICATE OF CORRECTION

PATENT NO. : 5,244,757
DATED : September 14, 1993
INVENTOR(S) : Norio Takami et al.

It is certified that error appears in the above-indentified patent and that said Letters Patent is hereby corrected as shown below:

On the title page, column 1, the second inventor's last name change "Ohasaki," to --Ohsaki,--.

Signed and Sealed this

Thirteenth Day of September, 1994

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,244,757
DATED : September 14, 1993
INVENTOR(S) : NORIO TAKAMI et al.

It is certified that error appears in the above-indentified patent and that said Letters Patent is hereby corrected as shown below:

Columns 9 & 10, Tables 1-3, under the column heading "Mean Diameter" _ONLY_ "(nm)" should be --µm--;

Columns 11 & 12, Tables 3-continued & 4, under the column heading "Mean Diameter" _ONLY_ "(nm)" should be --µm--;

Column 12, line 28, "1^mm to 15^mm" should be --1µm to 15µm--;

line 29, "5^mm" should be --5µm--;
line 63, "40^mm" should be --40µm--;

Column 13, Tables 5 & 6, under the column heading "Mean Diameter" _ONLY_ "(nm)" should be --µm--;

line 43, "6^mm" should be --6µm--;

Column 14, line 28, "10^mm" should be --10µm--.

Columns 15 & 16, Table 7, under the column heading "Mean Diameter" _ONLY_ "(nm)" should be --µm--;

Signed and Sealed this

Eighteenth Day of October, 1994

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,244,757
DATED : September 14, 1993
INVENTOR(S) : Takami et al

It is certified that error appears in the above-identified patent and that said Letters Patent is hereby corrected as shown below:

Col. 18, line 37, claim 16 - "The battery of claim 1 or claim 9" should read --The battery of claim 9--.

Col. 18, line 50, claim 18 - "The battery of either of claims 1 or 9" should read --The battery of claim 9--.

Signed and Sealed this

Twenty-ninth Day of June, 1999

Attest:

Q. TODD DICKINSON

*Attesting Officer*      *Acting Commissioner of Patents and Trademarks*